United States Patent
Matsunaga et al.

(10) Patent No.: US 11,592,192 B2
(45) Date of Patent: Feb. 28, 2023

(54) INDOOR UNIT OF AIR-CONDITIONING APPARATUS AND AIR-CONDITIONING APPARATUS

(71) Applicant: Mitsubishi Electric Corporation, Tokyo (JP)

(72) Inventors: Naoya Matsunaga, Tokyo (JP); Tatsuo Furuta, Tokyo (JP); Hironobu Suehiro, Tokyo (JP); Katsuya Ishigami, Tokyo (JP); Yoshie Nakaya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 443 days.

(21) Appl. No.: 16/652,529

(22) PCT Filed: Dec. 8, 2017

(86) PCT No.: PCT/JP2017/044197
§ 371 (c)(1),
(2) Date: Mar. 31, 2020

(87) PCT Pub. No.: WO2019/111406
PCT Pub. Date: Jun. 13, 2019

(65) Prior Publication Data
US 2020/0240651 A1 Jul. 30, 2020

(51) Int. Cl.
*F24F 1/00* (2019.01)
*F24F 1/0063* (2019.01)
(Continued)

(52) U.S. Cl.
CPC .......... *F24F 1/0063* (2019.02); *F24F 13/222* (2013.01); *F24F 13/30* (2013.01); *F24F 2013/227* (2013.01)

(58) Field of Classification Search
CPC .......... F24F 13/22; F24F 1/0063; F24F 13/30; F24F 2013/22; F24F 1/00; F24F 1/0068;
(Continued)

(56) References Cited

U.S. PATENT DOCUMENTS

2018/0045343 A1* 2/2018 Burrowes ................. B32B 5/02

FOREIGN PATENT DOCUMENTS

| CN | 202083046 U | 12/2011 |
| CN | 202220913 U | 5/2012 |

(Continued)

OTHER PUBLICATIONS

Extended European Search Report dated Oct. 27, 2020 issued in corresponding European patent application No. 17933984.1.
(Continued)

*Primary Examiner* — Harry E Arant
(74) *Attorney, Agent, or Firm* — Posz Law Group, PLC (57) ABSTRACT

An indoor unit of an air-conditioning apparatus includes a heat-medium heat exchanger, an air vent valve, a drain pan, and a hose. The heat-medium heat exchanger is provided in a housing to cause heat exchange to be performed between a heat medium and indoor air. The air vent valve allows air to escape from a heat medium passage that allows the heat medium to flow in the heat-medium heat exchanger. The drain pan is provided below the heat-medium heat exchanger to receive condensation water generated at a surface of the heat-medium heat exchanger. The hose has flexibility, and is attached to the air vent valve, and provided to let out the air along with the heat medium from the heat medium passage to the inner space in the drain pan. The hose has a double-wall structure and an upper end portion of the hose is fixed to the air vent valve.

19 Claims, 9 Drawing Sheets

(51) Int. Cl.
*F24F 13/22* (2006.01)
*F24F 13/30* (2006.01)

(58) Field of Classification Search
CPC ....... F24F 1/0059; F24F 1/0067; E04D 13/04; E04D 13/08; F28D 1/047; F16L 11/08; F16L 11/04; F16L 11/20
See application file for complete search history.

(56) References Cited

FOREIGN PATENT DOCUMENTS

| CN | 205534654 U | 8/2016 |
|---|---|---|
| CN | 206591743 U | 10/2017 |
| DE | 202010010532 U1 | 10/2010 |
| JP | S61-032894 U | 2/1986 |
| JP | S63-034922 U | 3/1988 |
| JP | H06-257776 A | 9/1994 |
| JP | H09-210392 A | 8/1997 |
| JP | H09210392 A * | 8/1997 |
| JP | 2012-247131 A | 12/2012 |

OTHER PUBLICATIONS

Office Action dated Mar. 25, 2021 issued in corresponding CN patent application No. 201780097446.2 (and English translation).
International Search Report of the International Searching Authority dated Feb. 20, 2018 in corresponding International Patent Application No. PCT/JP2017/044197 (and English translation).
Office Action dated Mar. 3, 2022 issued in corresponding CN patent application No. 201780097446.2 (and English translation).
Office Action dated Sep. 13, 2021 issued in corresponding CN patent application No. 201780097446.2 (and English translation).

* cited by examiner

INDOOR UNIT OF AIR-CONDITIONING APPARATUS AND AIR-CONDITIONING APPARATUS

CROSS REFERENCE TO RELATED APPLICATION

This application is a U.S. national stage application of PCT/JP2017/044197 filed on Dec. 8, 2017, the contents of which are incorporated herein by reference.

TECHNICAL FIELD

The present disclosure relates to an indoor unit of an air-conditioning apparatus that includes an air vent valve and to the air-conditioning apparatus.

BACKGROUND ART

Conventionally, for example, when an indoor unit is installed, air is mixed in a heat medium in a heat medium passage. As a result, in a heat-medium heat exchanger, the flow of the heat medium is obstructed, or the efficiency of heat exchange is reduced. As a countermeasure against such a problem, air in the heat medium passage is escaped from the heat medium passage.

In an air escape from the heat medium passage, air that flows in an air-vent hose connected to an air vent valve that is in an opened state is caused to escape along with a heat medium from the heat medium passage. A distal end of a lower end portion of the hose is accommodated in a drain pan that is provided to receive condensed water generated from the heat-medium heat exchanger during the operation of the indoor unit. Thus, the heat medium that flows along with the air out of the heat medium passage during the air escape is collected in the inner space in the drain pan, and is then made to flow out of the drain pan to the outside of the indoor unit.

The number of hoses prepared for the above purpose is one (see, for example, Patent Literature 1).

CITATION LIST

Patent Literature

Patent Literature 1: Japanese Unexamined Patent Application Publication No. 9-210392

SUMMARY OF INVENTION

Technical Problem

In the case where the hose is provided in space in which a plurality of branch pipes connected to the heat-medium heat exchanger are irregularly arranged, the hose is bent in such a manner as to circumvent the branch pipes. Therefore, the hose is formed of soft material that is material of a rubber tube such as a PVC tube, and has flexibility. However, the air vent hose may be greatly deformed. In such a case, a lower portion of the hose cannot maintain a cross section necessary for letting out air from the hose, the hose is blocked up not to allow the flow of a heat medium, and the distal end of the lower end portion of the hose thus moves uncontrollably.

To prevent the distal end of the lower end portion of the hose from moving uncontrollably, the hose may be fixed by a fixing member. However, if the fixing member is further added into the space in which the plurality of branch pipes are irregularly arranged, an extra space for provision of the fixing member is required, and the number of components increases.

The embodiment of the present disclosure has been made to solve the above problems, and the present disclosure relates to an indoor unit of an air-conditioning apparatus and an air-conditioning apparatus, in which a distal end of a lower end portion of an air vent hose can be prevented from moving uncontrollably, without changing a simple structure of the hose and also without adding an extra component.

Solution to Problem

An indoor unit of an air-conditioning apparatus according to the present disclosure includes: a heat-medium heat exchanger provided in a housing to cause heat exchange to be performed between a heat medium and indoor air; an air vent valve provided to allow air to escape from a heat medium passage that allows the heat medium to flow in the heat-medium heat exchanger; a drain pan provided below the heat-medium heat exchanger to receive condensation water generated at a surface of the heat-medium heat exchanger; and a hose having flexibility, attached to the air vent valve, and provided to let out the air along with the heat medium from the heat medium passage to an inner space in the drain pan. The hose has a double-wall structure and an upper end portion of the hose is fixed to the air vent valve.

An indoor unit of an air-conditioning apparatus according to the present disclosure includes: a heat-medium heat exchanger provided in a housing to cause heat exchange to be performed between a heat medium and indoor air; an air vent valve provided to allow air to escape from a heat medium passage that allows the heat medium to flow in the heat-medium heat exchanger; a drain pan provided below the heat-medium heat exchanger to receive condensation water generated at a surface of the heat-medium heat exchanger; a hose having flexibility, attached to the air vent valve, and provided to let out the air along the heat medium from the heat medium passage to an inner space in the drain pan; and a plurality of branch pipes provided to allow the heat medium to flow into the heat-medium heat exchanger or allow the heat medium to flow out of the heat-medium heat exchanger. At least one of the plurality of branch pipes is bent around the hose and holds the hose.

An air-conditioning apparatus according to the present disclosure includes the above indoor unit of the air-conditioning apparatus.

Advantageous Effects of Invention

In the indoor unit of the air-conditioning apparatus and the air-conditioning apparatus according to the present disclosure, the distal end of the lower end portion of the air vent hose can be prevented from moving uncontrollably, without changing the simple structure of the hose and also without adding an extra component.

DESCRIPTION OF EMBODIMENT

An embodiment of the present disclosure will be described with reference to the drawings. In each of the figures, components that are the same as or equivalent to those in a previous figure are denoted by the same reference signs. The same is true of the entire text of the specification. In each of sectional views, hatching is omitted as appropriate for viewability. Configurations of components that are described in the entire text of the specification are merely examples, that is, the configurations of the components are not limited to the described configurations.

Embodiment 1

<Configuration of Air-Conditioning Apparatus>

Figure 1:
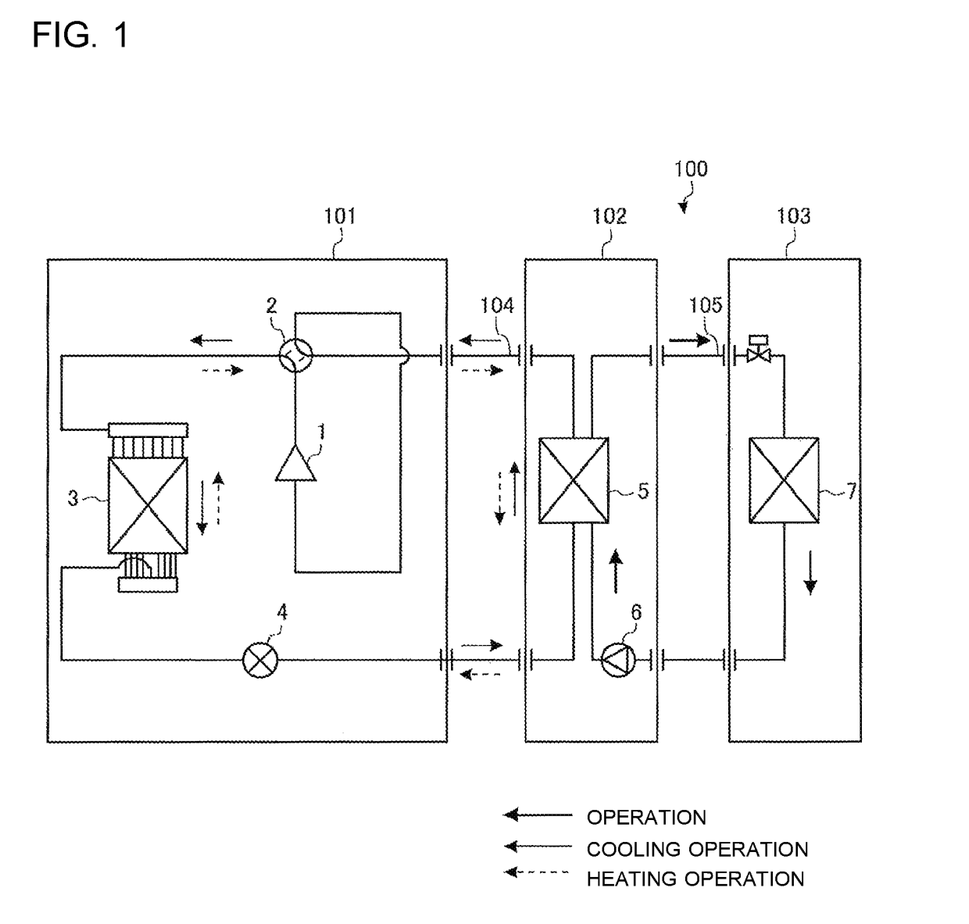
FIG. 1 illustrates an outline configuration of an air-conditioning apparatus according to Embodiment 1 of the present disclosure.

FIG. 1 is a schematic configuration view of an air-conditioning apparatus 100 according to Embodiment 1 of the present disclosure. The air-conditioning apparatus 100 as illustrated in FIG. 1 includes an outdoor unit 101, a relay unit 102, and an indoor unit 103.

The outdoor unit 101 and the relay unit 102 form a refrigerant circuit 104. The refrigerant circuit 104 includes a compressor 1, a four-way valve 2, an outdoor heat exchanger 3, an expansion valve 4, and a heat-transfer heat exchanger 5.

The relay unit 102 and the indoor unit 103 form a water circuit 105 as a heat medium circuit. Non-flammable material such as water or brine is used as a heat medium. The following description is made by referring to the case where water is used as the heat medium. The water circuit 105 includes the heat-transfer heat exchanger 5, a pump 6, and an indoor heat exchanger 7 that serves as a heat-medium heat exchanger.

The outdoor unit 101 includes the compressor 1, the four-way valve 2, the outdoor heat exchanger 3, and the expansion valve 4. The outdoor unit 101 includes a fan (not illustrated) provided to promote heat exchange between outdoor air and refrigerant at the outdoor heat exchanger 3. The outdoor unit 101 includes a control unit (not illustrated) that controls the compressor 1, the four-way valve 2, the expansion valve 4, the fan, etc.

The compressor 1 compresses sucked refrigerant and then discharges the refrigerant. The four-way valve 2 switches the flow of the refrigerant in accordance with whether a cooling operation or a heating operation is performed. The outdoor heat exchanger 3 causes heat exchange to be performed between outdoor air and the refrigerant. The outdoor heat exchanger 3 operates as a condenser during the cooling operation, and condenses and liquifies the refrigerant. The outdoor heat exchanger 3 operates as an evaporator during the heating operation, and gasifies and evaporates the refrigerant. The expansion valve 4 regulates the pressure of the refrigerant and expands the refrigerant. The refrigerant circuit 104 of the outdoor unit 101 sends refrigerant that holds heat as such as cooling energy or heating energy to the relay unit 102.

The relay unit 102 includes the heat-transfer heat exchanger 5 and the pump 6. The heat-transfer heat exchanger 5 transfers heat such as cooling energy or heating energy of refrigerant that flows in the refrigerant circuit 104 to water that flows in the water circuit 105. The heat-transfer heat exchanger 5 operates as an evaporator during the cooling operation, and gasifies and evaporates the refrigerant. The heat-transfer heat exchanger 5 operates as a condenser during the heating operation, and condenses and liquifies the refrigerant. The pump 6 regulates the amount of the water that flows in the water circuit 105. The relay unit 102 includes a control unit (not illustrated) that controls the pump 6.

The indoor unit 103 includes the indoor heat exchanger 7 that causes heat exchange to be performed between water and indoor air. The indoor unit 103 includes a fan (not illustrated) provided to promote heat exchange between water and indoor air at the indoor heat exchanger 7. The indoor unit 103 includes a control unit (not illustrated) that controls the fan and other components.

The outdoor unit 101, the relay unit 102, and the indoor unit 103 include respective control units as described above. However, these control units may be combined into a single control unit, and the single control unit may be provided at any one of the outdoor unit 101, the relay unit 102, and the indoor unit 103. Alternatively, the control units may be kept separate from each other, or some of them may be combined, such that the control units are provided at respective units or selected ones of the units. Each of the control units includes a storage unit that stores a program and a central processing unit (CPU) that executes processing according to the program.

Because of the above configuration of the air-conditioning apparatus 100, the operation of the air-conditioning apparatus 100 can be switched from one of the cooling operation and the heating operation to the other by switching the flow of the refrigerant using the four-way valve 2 of the outdoor unit 101.

<Indoor Unit 103 of Air-Conditioning Apparatus 100>

Figure 2:
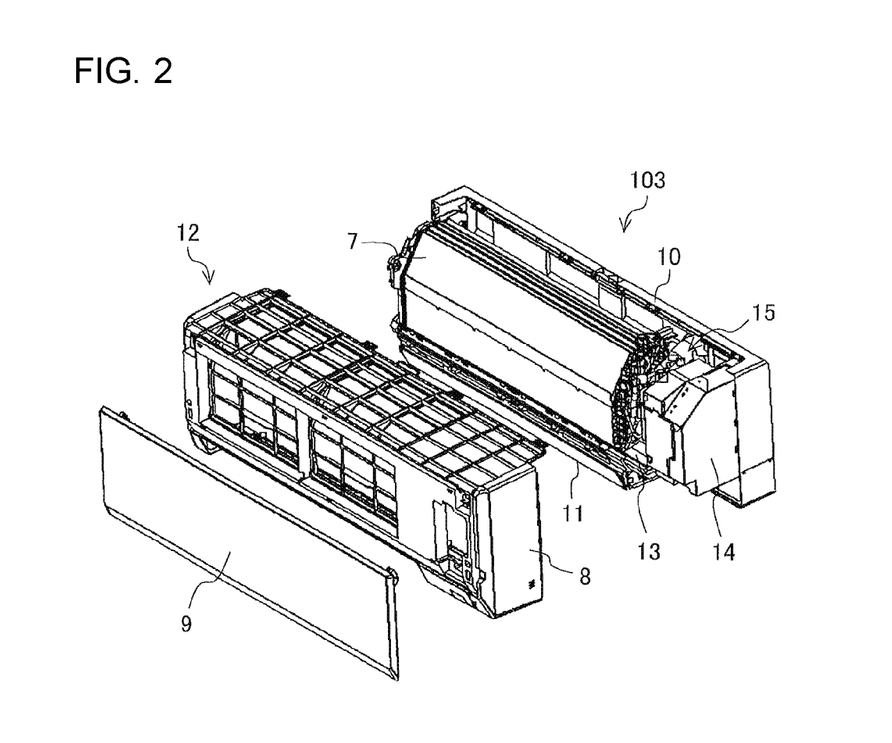
FIG. 2 is an exploded perspective view illustrating components of an indoor unit of the air-conditioning apparatus according to Embodiment 1 of the present disclosure.
Figure 3:
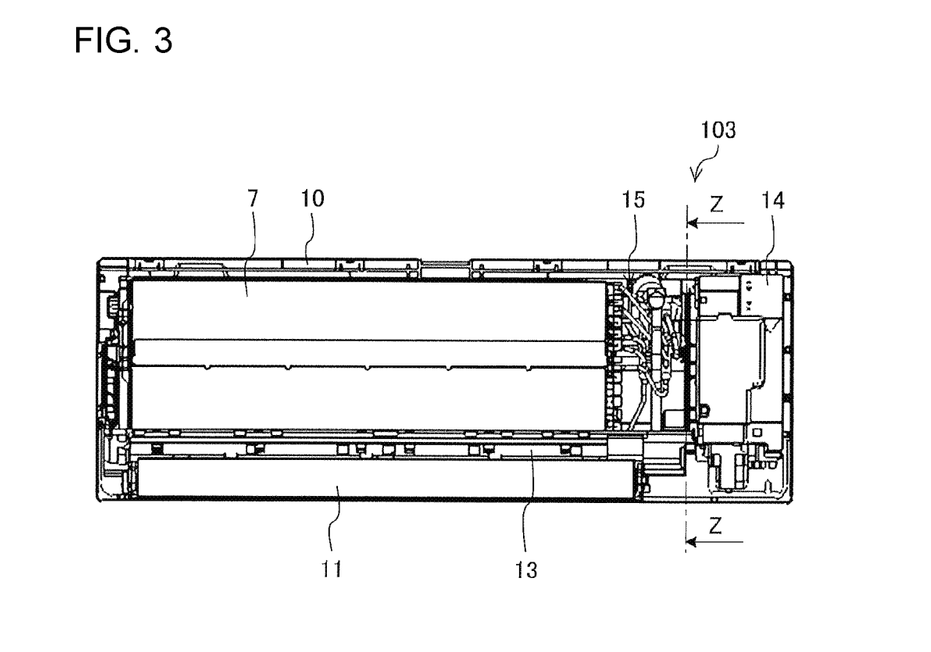
FIG. 3 is a front view illustrating the indoor unit of the air-conditioning apparatus according to Embodiment 1 of the present disclosure, with a panel of the indoor unit detached from the indoor unit.

FIG. 2 is an exploded perspective view illustrating components of the indoor unit 103 of the air-conditioning apparatus 100 according to Embodiment 1 of the present disclosure. FIG. 3 is a front view illustrating the indoor unit 103 of the air-conditioning apparatus 100 according to Embodiment 1 of the present disclosure, with a panel 8 of the indoor unit 103 detached from the indoor unit 103.

As illustrated in FIGS. 2 and 3, the indoor unit 103 of the air-conditioning apparatus 100 is a wall mounted unit that is cuboid. The indoor unit 103 includes a housing 12 as an outer peripheral portion of the indoor unit 103. To be more specific, the indoor unit 103 includes the panel 8, a grille 9, a box 10, and a vane 11 that form the housing 12. In the housing 12 of the indoor unit 103, the indoor heat exchanger 7, a drain pan 13, and an electrical component box 14 are provided.

The indoor heat exchanger 7 is provided in space from an upper region of the inside of the housing 12 to a central region of the inside, and causes heat exchange to be performed between water and indoor air. The indoor heat exchanger 7 is formed in such a manner as to have a cross section formed in the shape of a mountain from a front side of the indoor heat exchanger 7 to a back side thereof. In space located inward of the indoor heat exchanger 7 having such a cross section, the fan (not illustrated) is provided. The fan (not illustrated) is, for example, a cross-flow fan.

The drain pan 13 is provided below the indoor heat exchanger 7 to receive condensation water generated at a surface of the indoor heat exchanger 7. The drain pan 13 has a bottom 13a that is wider than a horizontal surface of the indoor heat exchanger 7 and that receives condensation water. The bottom 13a of the drain pan 13 extends to a position located below a pipe unit 15 that will be described later and is provided rightward of the indoor heat exchanger 7 as viewed from the front in the figure. The drain pan 13 receives condensation water generated at surfaces of a first manifold pipe 16, a second manifold pipe 17, and a plurality of branch pipes 18 that will be described below and that are provided in the pipe unit 15. The drain pan 13 receives water let out from a hose 19 that will be described later and is provided in the pipe unit 15. In the drain pan 13, for example, condensed water received at the bottom 13a is made to flow out from an exhaust outlet (not illustrated) to the outside of the indoor unit 103.

The electrical component box 14 is waterproofed and hermetically houses a control module, a control circuit board (not illustrated) that control the indoor unit 103, and other components.

<Configuration of Pipe Unit 15>

Figure 4:
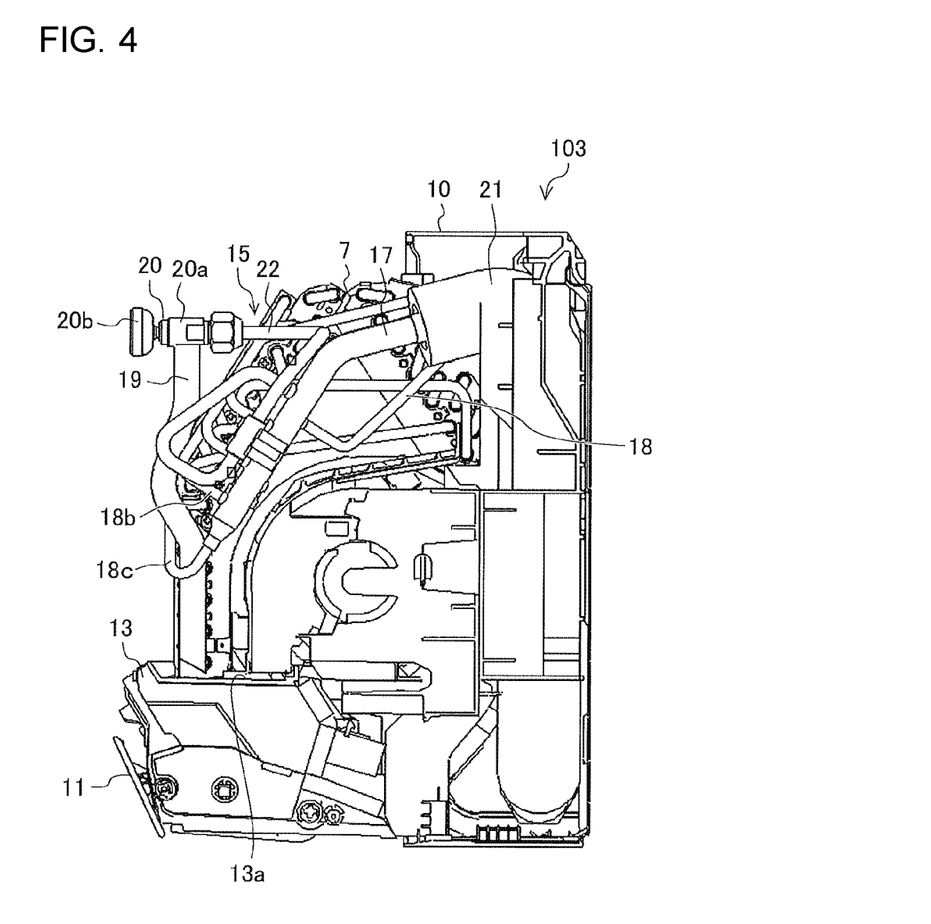
FIG. 4 is a vertical sectional view that illustrates the indoor unit of the air-conditioning apparatus according to Embodiment 1 of the present disclosure, with the panel of the indoor unit detached from the indoor unit, and that is taken along line Z-Z in FIG. 3.
Figure 5:
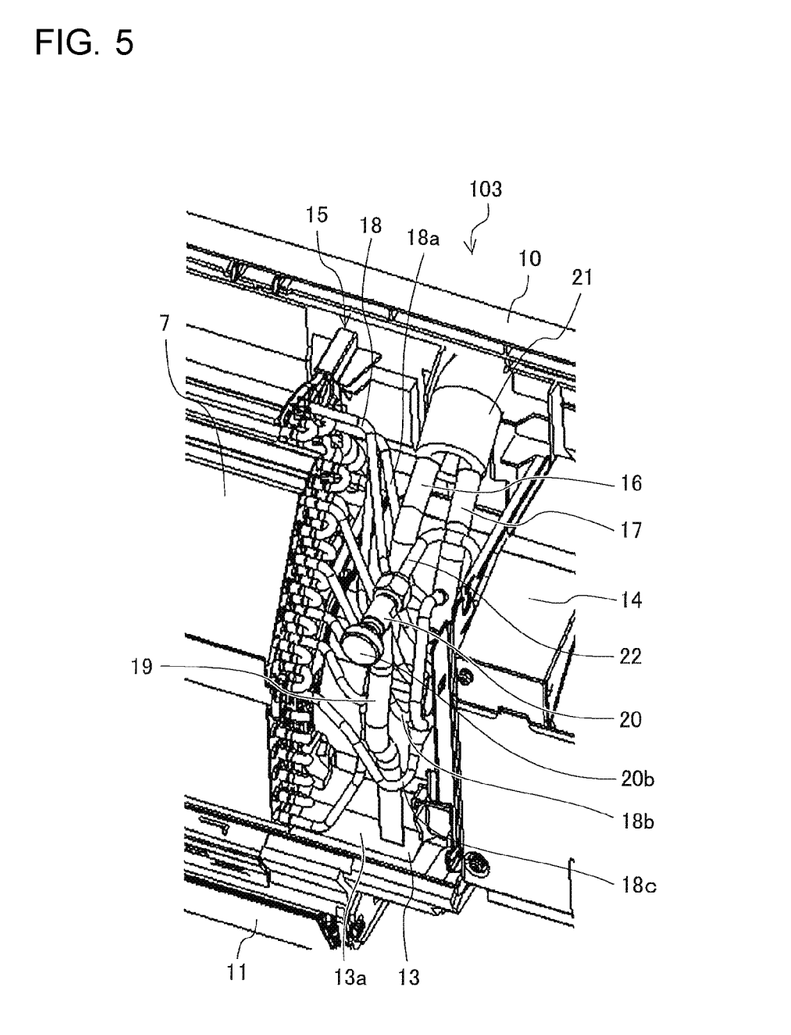
FIG. 5 is an enlarged perspective view illustrating a pipe unit of the indoor unit of the air-conditioning apparatus according to Embodiment 1 of the present disclosure, with the panel of the indoor unit detached from the indoor unit.
Figure 6:
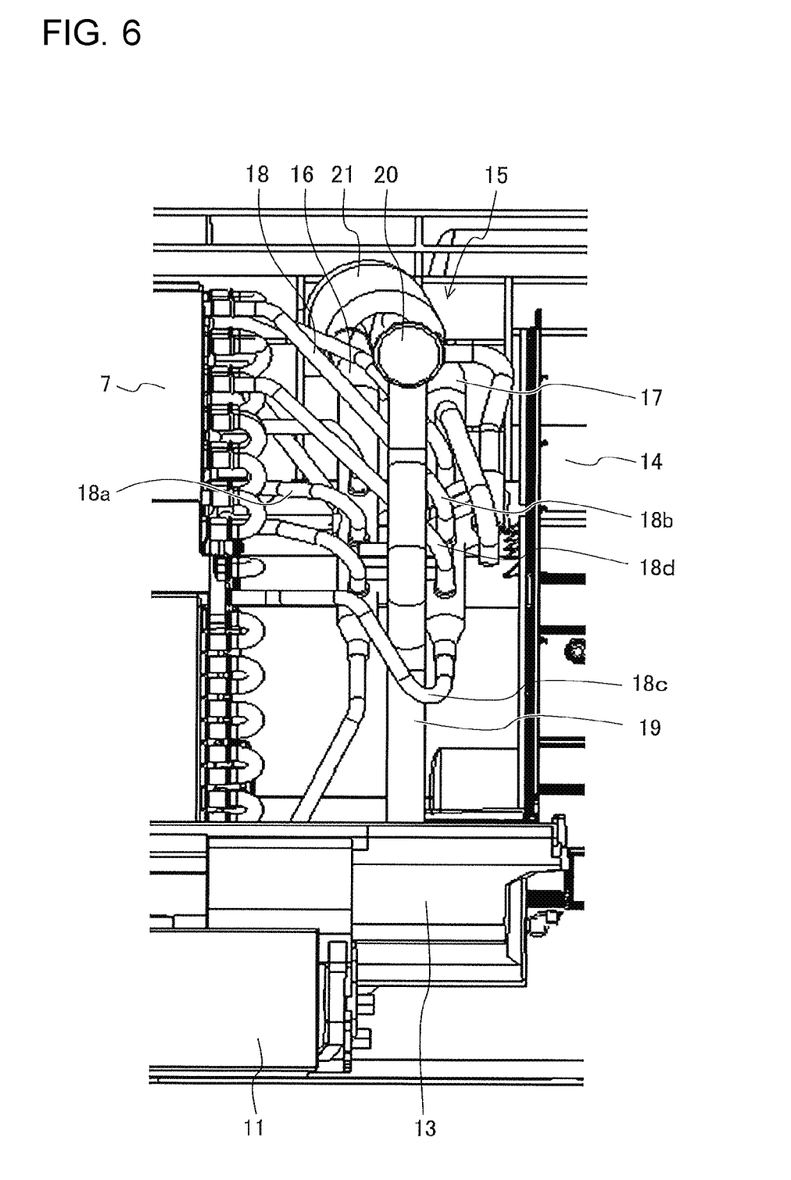
FIG. 6 is an enlarged front view illustrating the pipe unit of the indoor unit of the air-conditioning apparatus according to Embodiment 1 of the present disclosure, with the panel of the indoor unit detached from the indoor unit.

FIG. 4 is a vertical sectional view that illustrates the indoor unit 103 of the air-conditioning apparatus 100 according to Embodiment 1 of the present disclosure, with the panel 8 of the indoor unit 103 detached from the indoor unit 103, and that is taken along line Z-Z in FIG. 3. FIG. 5 is an enlarged perspective view illustrating the pipe unit 15 of the indoor unit 103 of the air-conditioning apparatus 100 according to Embodiment 1 of the present disclosure, with the panel 8 of the indoor unit 103 detached from the indoor unit 103. FIG. 6 is an enlarged front view illustrating the pipe unit 15 of the indoor unit 103 of the air-conditioning apparatus 100 according to Embodiment 1 of the present disclosure, with the panel 8 of the indoor unit 103 detached from the indoor unit 103.

As illustrated in FIGS. 4 to 6, in the indoor unit 103, the pipe unit 15 is provided between the indoor heat exchanger 7 and the electrical component box 14. The pipe unit 15 includes an air vent valve 20, the hose 19, the plurality of branch pipes 18, the first manifold pipe 16, the second manifold pipe 17, and a heat insulating pipe 21.

The air vent valve 20 allows air to escape from a water passage in the water circuit 105 that allows water to flow in the indoor heat exchanger 7. The air vent valve 20 is provided at an end portion on the front side of an air vent pipe 22 connected to the second manifold pipe 17.

The hose 19 is formed of soft material that is material of a rubber tube such as a PVC tube, and has flexibility. The hose 19 is attached to the air vent valve 20. The hose 19 extends toward the drain pan 13 that is provided to receive condensed water generated in the indoor heat exchanger 7 and also extends in such a manner as to circumvent the plurality of branch pipes 18, the first manifold pipe 16, and the second manifold pipe 17. When the air vent valve 20 is opened to escape air, the hose 19 lets out air along with water from the water passage in the water circuit 105 to the drain pan 13. The hose 19 has a double-pipe structure and an upper end portion of the hose 19 is fixed to the air vent valve 20. The hose 19 will be described in detail later.

The plurality of branch pipes 18 are pipes that allow water to flow into the indoor heat exchanger 7 or allow water to flow out of the indoor heat exchanger 7. A branch pipe 18a of the plurality of branch pipes 18 is connected to the indoor heat exchanger 7 and the first manifold pipe 16 and allows water to flow between the indoor heat exchanger 7 and the first manifold pipe 16. A branch pipe 18b of the plurality of branch pipes 18 is connected to the indoor heat exchanger 7 and the second manifold pipe 17 and allows water to flow between the indoor heat exchanger 7 and the second manifold pipe 17.

During the cooling operation, water cooled by the outdoor unit 101 of the air-conditioning apparatus 100 flows into the branch pipe 18a of the plurality of branch pipes 18 through the first manifold pipe 16, and then flows from the branch pipe 18a into the indoor heat exchanger 7. The water subjected to heat exchange at the indoor heat exchanger 7 flows into the branch pipe 18b of the plurality of branch pipes 18, and flows from the branch pipe 18b into the second manifold pipe 17.

During the heating operation, water heated by the outdoor unit 101 of the air-conditioning apparatus 100 flows into the branch pipe 18b through the second manifold pipe 17, and then flows from the branch pipe 18b into the indoor heat exchanger 7.

The water subjected to heat exchange at the indoor heat exchanger 7 flows into the branch pipe 18b, and then flows from the branch pipe 18b into the first manifold pipe 16.

The plurality of branch pipes 18 are variously bent in the pipe unit 15. As designed, the plurality of bent branch pipes 18 are connected to respective heat transfer pipes of the indoor heat exchanger 7 (which are not illustrated) at respective connection positions. The relationship between the hose 19 and the plurality of branch pipes 18 will be described later.

The first manifold pipe 16 is connected to the branch pipe 18a of the plurality of branch pipes 18. The first manifold pipe 16 allows water that is to be supplied to the indoor heat exchanger 7 during the cooling operation to flow through the first manifold pipe 16. Also, the first manifold pipe 16 allows water subjected to heat exchange at the indoor heat exchanger 7 during the heating operation to flow through the first manifold pipe 16.

The second manifold pipe 17 is connected to the branch pipe 18b of the plurality of branch pipes 18. The second manifold pipe 17 allows water that flows out of the indoor heat exchanger 7 during the cooling operation to flow through the second manifold pipe 17. Also, the second manifold pipe 17 allows water that is to be supplied to the indoor heat exchanger 7 during the heating operation to flow through the second manifold pipe 17.

In the first manifold pipe 16 and the second manifold pipe 17, the flow direction of water during the cooling operation and that during the heating operation may be reversed.

As viewed from the front side, the first manifold pipe 16 and the second manifold pipe 17 extend in an up-and-down direction on the right side of the indoor heat exchanger 7 and are arranged in parallel with each other. Also, as viewed from the front side, the air vent valve 20 and the hose 19 are provided between the first manifold pipe 16 and the second manifold pipe 17.

The heat insulating pipe 21 holds both the first manifold pipe 16 and the second manifold pipe 17, and extends from indoor space to outdoor space. The heat insulating pipe 21 insulates the first manifold pipe 16 and the second manifold pipe 17 to prevent the first manifold pipe 16 and the second manifold pipe 17 from being affected by heat from the outside of the first manifold pipe 16 and the second manifold pipe 17.

<Details of Air Vent Valve 20>

Figure 7:
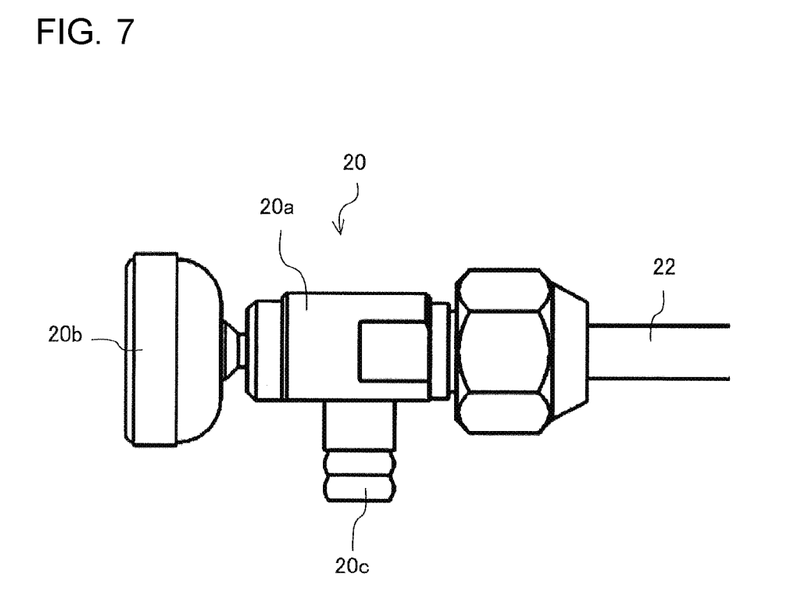
FIG. 7 is a side view of an air vent valve in the indoor unit of the air-conditioning apparatus according to Embodiment 1 of the present disclosure.

FIG. 7 is a side view of the air vent valve 20 in the indoor unit 103 of the air-conditioning apparatus 100 according to Embodiment 1 of the present disclosure. The air vent valve 20 includes a main body 20a, a knob 20b, and an exhaust outlet portion 20c.

The main body 20a of the air vent valve 20 is connected to the end portion on the front side of the air vent pipe 22. The knob 20b is provided integrally with a valve body 20d that is screwed into the main body 20a on the front side of the main body 20a such that the valve body 20d is rotatable. The knob 20b includes a display unit (not illustrated) that indicates opening/closing of the air vent valve 20. The knob 20b is discoid. By rotating the knob 20b in a circumferential direction, that is, in a clockwise direction or a counter-clockwise direction, the valve body 20d is moved toward the front side or the back side, and the air vent valve 20 can thus be opened or closed. The exhaust outlet 20c is located at a lower end portion of the main body 20a and is an opening that faces downwards. The upper end portion of the hose 19 is attached to the exhaust outlet 20c.

When the air vent valve 20 is opened, at the pipe unit 15, air and water in the water passage flow into the pipe unit 15 from the air vent pipe 22 that communicates with the second manifold pipe 17, and the air flows along with the water out of the water passage through the exhaust outlet 20c.

<Details of Hose 19>

Figure 8:
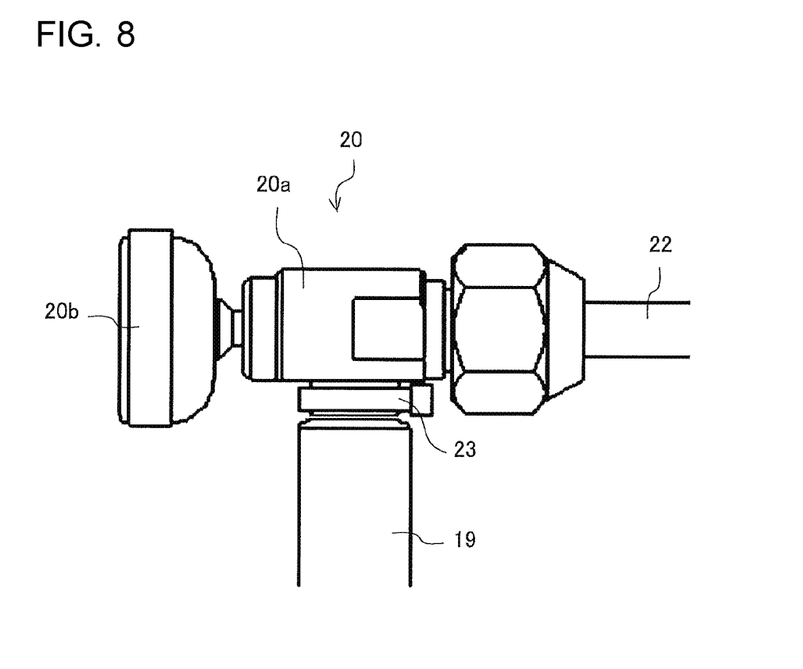
FIG. 8 is a side view illustrating the air vent valve in the indoor unit of the air-conditioning apparatus according to Embodiment 1 of the present disclosure, with a hose fixed to the air vent valve.
Figure 9:
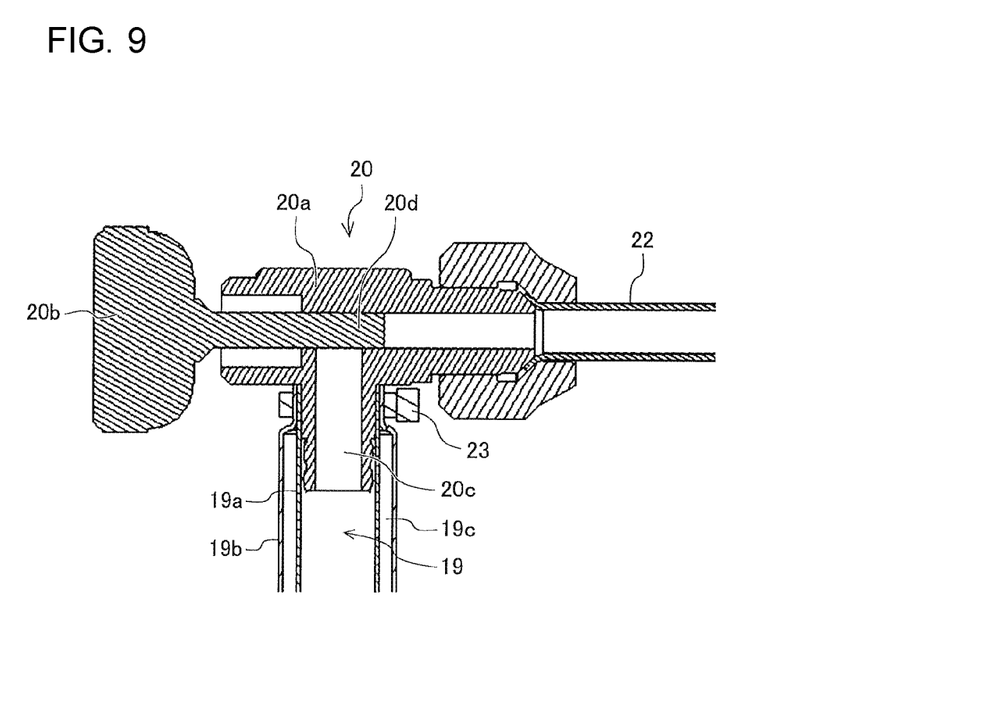
FIG. 9 is a vertical sectional view illustrating the air vent valve in the indoor unit of the air-conditioning apparatus according to Embodiment 1 of the present disclosure, with the hose fixed to the air vent valve.

FIG. 8 is a side view illustrating the air vent valve 20 in the indoor unit 103 of the air-conditioning apparatus 100 according to Embodiment 1 of the present disclosure, with the hose 19 fixed to the air vent valve 20. FIG. 9 is a vertical sectional view illustrating the air vent valve 20 in the indoor unit 103 of the air-conditioning apparatus 100 according to Embodiment 1 of the present disclosure, with the hose 19 fixed to the air vent valve 20.

As illustrated in FIGS. 8 and 9, the hose 19 has the double-wall structure, and includes an inner exhaust pipe 19a and an outer protection pipe 19b. The inner exhaust pipe 19a and the outer protection pipe 19b are formed of the same material having flexibility. The inner exhaust pipe 19a is directly fitted onto the exhaust outlet 20c of the air vent valve 20. The inner exhaust pipe 19a is provided in the outer protection pipe 19b. Thus, the outer protection pipe 19b is located outward of the inner exhaust pipe 19a fitted on the exhaust outlet 20c of the air vent valve 20. Between an outer circumferential portion of the inner exhaust pipe 19a and an inner circumferential portion of the outer protection pipe 19b, a cylindrical gap 19c is provided.

The inner exhaust pipe 19a and the outer protection pipe 19b are fitted onto the exhaust outlet 20c of the air vent valve 20 and held in such a state. The inner exhaust pipe 19a and the outer protection pipe 19b are fixed to the exhaust outlet 20c by a binding band 23.

Regarding the fixation of the inner exhaust pipe 19a and the outer protection pipe 19b, the inner exhaust pipe 19a may be fixed to the exhaust outlet 20c by an adhesive, and the outer protection pipe 19b may be fixed to the inner exhaust pipe 19a by an adhesive.

<Distal End of Lower End Portion 19d of Hose 19>

Figure 10:
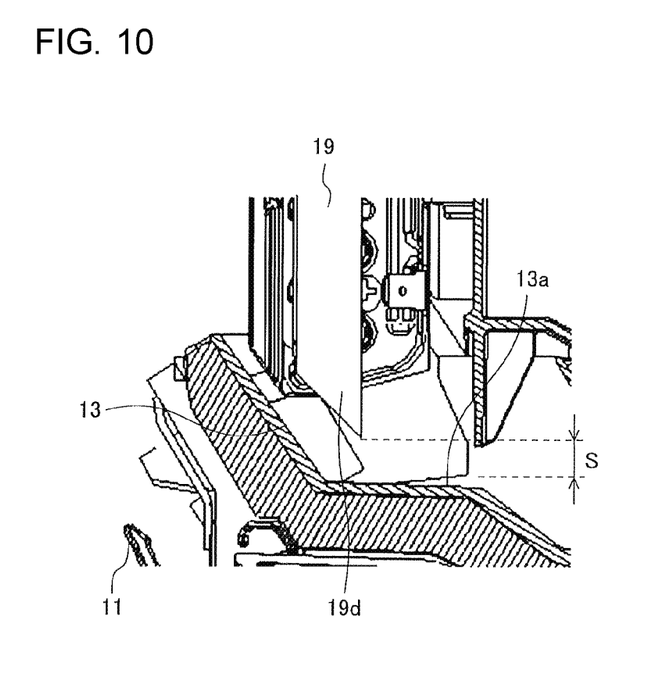
FIG. 10 is an enlarged vertical sectional view of a distal end of a lower end portion of the hose and a drain pan according to Embodiment 1 of the present disclosure.

FIG. 10 is an enlarged vertical sectional view of a distal end of a lower end portion 19d of the hose 19 and the drain pan 13 according to Embodiment 1 of the present disclosure. As illustrated in FIG. 10, the distal end of the lower end portion 19d of the hose 19 has an end face that is inclined relative to a horizontal direction.

The end face of the distal end of the lower end portion 19d of the hose 19 may be parallel to the horizontal direction. However, in this case, the distal end of the lower end portion 19d of the hose 19 is not satisfactorily drained dry.

Between the distal end of the lower end portion 19d of the hose 19 and the bottom 13a of the drain pan 1, a gap S is provided. The gap S is provided to cause sound to be made when water that flows out of the distal end of the lower end portion 19d of the hose 19 strikes the bottom 13a of the drain pan 13.

<Relationship Between Hose 19 and Branch Pipes 18>

Figure 11:
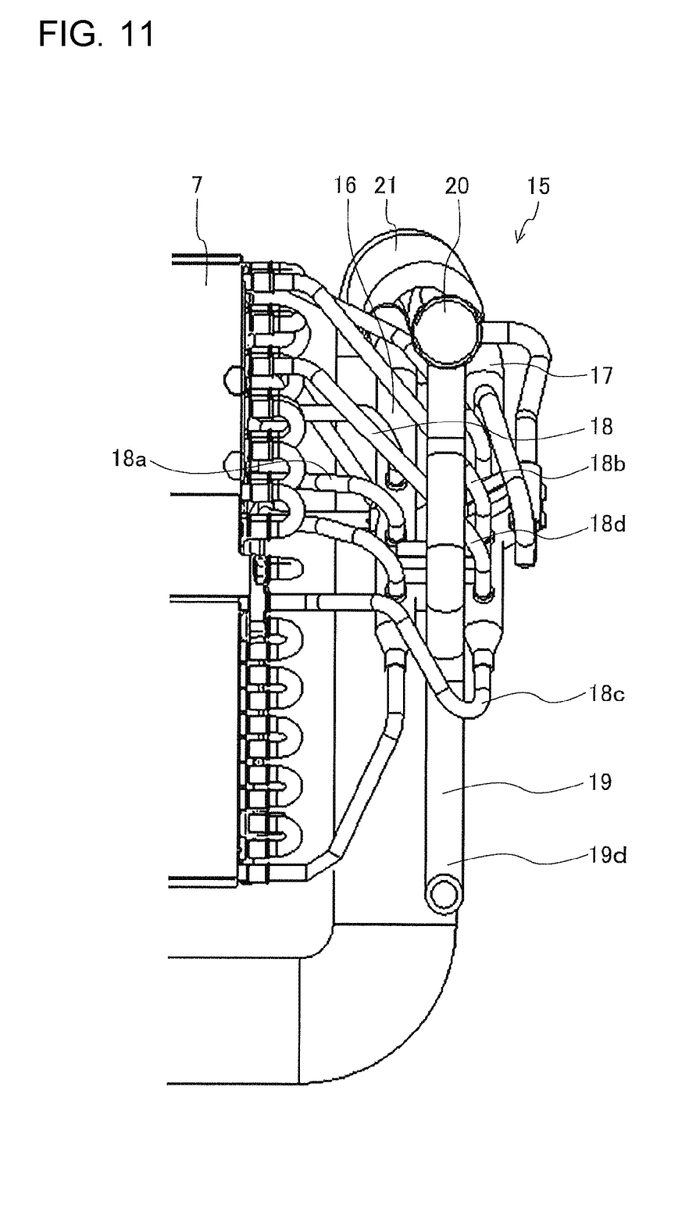
FIG. 11 is an enlarged front view including the hose, a plurality of branch pipes, a first manifold pipe, and a second manifold pipe in Embodiment 1 of the present disclosure.
Figure 12:
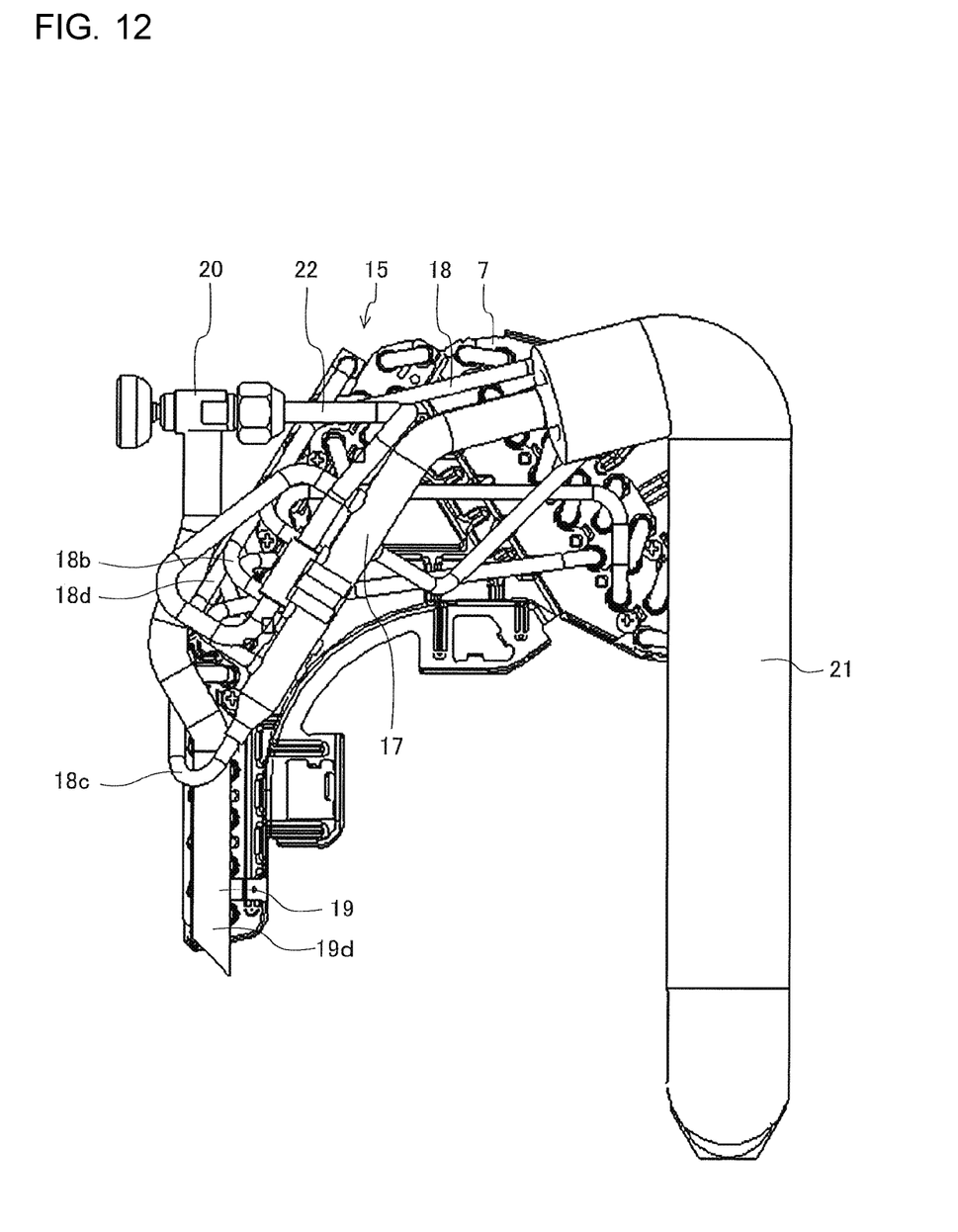
FIG. 12 is an enlarged side view illustrating the hose, the plurality of branch pipes, the first manifold pipe, and the second manifold pipe in Embodiment 1 of the present disclosure.

FIG. 11 is an enlarged front view illustrating the hose 19, the plurality of branch pipes 18, the first manifold pipe 16, and the second manifold pipe 17 in Embodiment 1 of the present disclosure. FIG. 12 is an enlarged side view illustrating the hose 19, the plurality of branch pipes 18, the first manifold pipe 16, and the second manifold pipe 17 in Embodiment 1 of the present disclosure.

As illustrated in FIGS. 11 and 12, a branch pipe 18c of the plurality of branch pipes 18 is bent around the hose 19 and holds the hose 19. The branch pipe 18c that holds the hose 19 is located in a lower portion of the housing 12. To be more specific, the branch pipe 18c extends from a distal end of a lower end portion of the second manifold pipe 17. The lowermost one of the plurality of branch pipes 18 is the branch pipe 18c that holds the hose 19.

It should be noted that the number of branch pipes 18c holding the hose 19 is one, but is not limited to one. That is, a plurality of branch pipes 18c may be provided to hold the hose 19. In addition, the position of the branch pipe 18c holding the hose 19 is not limited. It is preferable that the branch pipe 18c holding the hose 19 be connected to one of the first manifold pipe 16 and the second manifold pipe 17 that is further from the indoor heat exchanger 7 than the other.

In contrast, a branch pipe 18d of the plurality of branch pipes 18 that is located in an upper portion of the housing 12 is in contact with the hose 19 on a back side of the hose 19. The branch pipe 18d is extended toward the front side and is bent toward a connection position with the heat transfer pipe of the indoor heat exchanger 7. Thus, the branch pipe 18d is in contact with the hose 19 on a back side of the hose 19. Therefore, the branch pipe 18c holds the hose 19 that is in contact with the branch pipe 18d in the upper portion of the housing 12 and extends downwards, such that the distal end of the lower end portion 19d is located in an inner space in the drain pan 13.

The air vent valve 20 may be located closer to the front side than in the above configuration such that the hose 19 is not in contact with the branch pipe 18d in the upper portion of the housing 12. However, in such a configuration, the indoor unit 103 cannot made smaller; that is, this configuration is thus applicable only in the case where the housing 12 of the indoor unit 103 has sufficient space for provision of components.

Advantageous Effects of Embodiment 1

According to Embodiment 1, the indoor unit 103 of the air-conditioning apparatus 100 includes the indoor heat exchanger 7 provided in the housing 12 as a heat-medium heat exchanger that transfers heat between indoor air and water that is a heat medium. The indoor unit 103 includes the air vent valve 20 that allows air to escape from the water passage in the water circuit 105 that causes water to flow in the indoor heat exchanger 7. The indoor unit 103 includes the drain pan 13 that is provided below the indoor heat exchanger 7 to receive condensation water generated at the surface of the indoor heat exchanger 7. The indoor unit 103 includes the hose 19 that has flexibility, is attached to the air vent valve 20, and lets out air along with water from the water passage to the inner space in the drain pan 13. The hose 19 has a double-wall structure and the upper end portion of the hose 19 is fixed to the air vent valve 20.

In the above configuration, the hose 19 has the double-wall structure and the upper end portion of the hose 19 is fixed to the air vent valve 20. It is therefore possible to improve the stiffness of the hose 19 and to increase the weight of the hose 19. Thus, the hose 19 hardly collapses and is easily hung downwards. Therefore, the lower portion of the hose 19 can maintain a cross section necessary for letting out air, the hose 19 is not blocked up and thus allows the flow of water, and the distal end of the lower end portion 19d of the hose 19 does not move uncontrollably, whereby water can be smoothly let out from the hose 19. That is, it is possible to prevent the distal end of the lower end portion 19d of the air vent hose 19 from uncontrollably moving without adding an extra component and changing the simple structure of the air bent hose 19.

In the hose 19, even if one of the inner exhaust pipe 19a and the outer protection pipe 19b is detached from the air bent valve 20, the other can be kept fixed to the air vent valve 20 at the upper portion of the other. Thus, water does not directly flow out from the exhaust outlet 20c of the air vent valve 20, with the hose 19 not attached to the exhaust outlet 20c, and water does not fly off to the vicinity of the exhaust outlet 20c.

Furthermore, since the hose 19 has the double-wall structure and the upper end portion of the hose 19 is fixed to the air vent valve 20, even if the hose 19 is bent from an upper side of the hose 19 to the lower side of the hose 19 in such a manner as to circumvent the plurality of branch pipes 18, only the outer protection pipe 19b that is an outer one of the pipes in the hose 19 having the double-wall structure is deformed, the inner exhaust pipe 19a that is an inner one of the pipes in the hose 19 can maintain a cross section necessary for letting out air and water from the hose 19, the hose 19 is not blocked up and thus allows the flow of water, and the distal end of the lower end portion 19d of the hose 19 does not move uncontrollably, whereby water can be smoothly let out from the hose 19.

According to Embodiment 1, the indoor unit 103 of the air-conditioning apparatus 100 includes the indoor heat exchanger 7 that is provided in the housing 12 as a heat-medium heat exchanger that causes heat exchange to be performed between indoor air and water that is a heat medium. The indoor unit 103 includes the air vent valve 20 that allows air to escape from the water passage in the water circuit 105 that causes water to flow in the indoor heat exchanger 7. The indoor unit 103 includes the drain pan 13 that is provided below the indoor heat exchanger 7 to receive condensation water generated at the surface of the indoor heat exchanger 7. The indoor unit 103 includes the hose 19 that has flexibility, is attached to the air vent valve 20, and lets out air along with water from the water passage to the inner space in the drain pan 13. The indoor unit 103 includes the plurality of branch pipes 18 that allow water to flow into the indoor heat exchanger 7 or allow water to flow out of the indoor heat exchanger 7. At least one branch pipe 18c of the plurality of branch pipes 18 is bent around the hose 19 and holds the hose 19.

In the above configuration, at least the one branch pipe 18c is bent around the hose 19 and holds the hose 19. Thus, the lower portion of the hose 19 can maintain a cross section required to let out air along with water. Furthermore, the hose 19 is not blocked up and thus allows the flow of water, and the distal end of the lower end portion 19d of the hose 19 does not move uncontrollably, whereby water can be smoothly let out from the hose 19. No further fixing component is added, and at least one branch pipe 18c serves to allow water to flow into the indoor heat exchanger 7 and also hold the hose 19. Therefore, it is possible to prevent the distal end of the lower end portion 19d of the hose 19 from moving uncontrollably without changing the simple structure and adding an extra component.

A heat medium such as water or brine, which is not refrigerant, is supplied to the indoor heat exchanger 7. Thus, even if at least one branch pipe 18c is long in such a manner as to be bent around the hose 19 and to surround and hold the hose 19, the design heat efficiency of the indoor heat exchanger 7 is not decreased.

In Embodiment 1, in the indoor unit 103 of the air-conditioning apparatus 100, the branch pipe 18c that holds the hose 19 is located in the lower portion of the housing 12.

In the above configuration, at least one branch pipe 18c is bent around the lower portion of the hose 19 and holds the hose 19. Thus, the lower portion of the hose 19 that is held by the branch pipe 18c can maintain a cross section required to let out air and water. Furthermore, the hose 19 is not blocked up and thus allows the flow of water, and the distal end of the lower end portion 19d of the hose 19 does not move uncontrollably, whereby water can be smoothly let out. No further fixing component is added, and at least one branch pipe 18c serves to allow water to flow into the indoor heat exchanger 7 and also hold the hose 19. It is therefore possible to prevent the distal end of the lower end portion 19d of the hose 19 from moving uncontrollably without changing the simple structure and adding an extra component.

According to Embodiment 1, in the indoor unit 103 of the air-conditioning apparatus 100, the branch pipe 18d of the plurality of branch pipes 18 that is located in the upper portion of the housing 12 is in contact with the hose 19 on the back side of the hose 19. The branch pipe 18c holds the hose 19 that is in contact with the branch pipe 18d located in the upper portion of the housing 12 and extends downwards, such that the distal end of the lower end portion 19d of the hose 19 is located in the inner space in the drain pan 13.

In the configuration, the branch pipe 18c holds the hose 19 that is in contact with the branch pipe 18d located in the upper portion of the housing 12 and extends downwards, such that the distal end of the lower end portion 19d is located in the inner space in the drain pan 13. Thus, even if a stress acts on the hose 19 to move the lower portion of the hose 19 outwards such that the distal end of the lower end portion 19d is moved out of the inner space in the drain pan 13, the distal end of the lower end portion 19d is kept located in the inner space in the drain pan 13. This is because the hose 19 extends through space located inward of a bent portion of the branch pipe 18c that holds the hose 19, and the hose 19 is forcibly bent such that the distal end of the lower end portion 19d is located in the inner space in the drain pan 13. Therefore, the hose 19 is not blocked up and thus allows the flow of water, and the distal end of the lower end portion 19d of the hose 19 does not move uncontrollably, whereby water can be smoothly let out from the hose 19. Furthermore, no further fixing component is added, and at least one branch pipe 18c serves to allow water to flow in the indoor heat exchanger 7 and hold the hose 19. That is, it is possible to prevent the distal end of the lower end portion 19d of the hose 19 from moving uncontrollably without changing the simple structure of the hose 19 and adding an extra component.

The hose 19 is in contact with at least two of the plurality of branch pipes 18, that is, the hose 19 is in contact with the branch pipe 18d in the upper portion of the housing 12, and is also in contact with the branch pipe 18c that holds the hose 19 at a location where the hose 19 is located in the space located inward of the bent portion of the branch pipe 18c. Thus, the hose 19 can be firmly and stably held such that the state of the hose 19 is maintained in a position thereof in a further firm and stable manner.

Moreover, since the hose 19 has the double-wall structure and the upper end portion of the hose 19 is fixed to the air vent valve 20, even if the hose 19 is bent from the upper portion of the hose 19 to the lower portion of the hose 19, only the outer protection pipe 19b that is the outer one of the pipes provided in the hose 19 having the double-wall structure is deformed, and at least the inner exhaust pipe 19a that is the inner one of the pipes provided in the hose 19 can maintain a cross section required to let out air and water from the hose 19. Thus, the hose 19 is not blocked up and thus allows the flow of water, and the distal end pf the lower end portion 19d of the hose 19 does not move uncontrollably, whereby water can be smoothly let out from the hose 19.

In Embodiment 1, in the indoor unit 103 of the air-conditioning apparatus 100, the number of branch pipes 18c holding the hose 19 is one.

In the above configuration, the hose 19 is attached in the final step of an assembly procedure of the indoor unit 103. At this time, after fixed to the air vent valve 20, the hose 19 needs to be passed through the space located inward of the bent portion of the branch pipe 18c that holds the hose 19. Therefore, since the number of branch pipes 18c holding the hose 19 is one, the number of times the hose 19 is passed through the space located inward of the bent portion of the branch pipe 18c is also one, and the indoor unit 103 can thus be easily assembled.

In Embodiment 1, the indoor unit 103 of the air-conditioning apparatus 100 includes the first manifold pipe 16 that is connected to the branch pipe 18a of the plurality of branch pipes 18 and allows water that is to be supplied to the indoor heat exchanger 7 or allows water that flows out of the indoor heat exchanger 7 to flow through the first manifold pipe 16. The indoor unit 103 includes the second manifold pipe 17 that is connected to the branch pipe 18b of the plurality of branch pipes 18 and allows water that flows out of the indoor heat exchanger 7 or flow that is to be supplied to the indoor heat exchanger 7 to flow through the second manifold pipe 17. The first manifold pipe 16 and the second manifold pipe 17 are located beside the indoor heat exchanger 7 to extend in the up-and-down direction and are disposed side by side as viewed from the front side. The air vent valve 20 and the hose 19 are located between the first manifold pipe 16 and the second manifold pipe 17 as viewed from the front side.

In the configuration, the air vent valve 20 and the hose 19 can be provided in an empty region of space that is other than regions of the space in which the first manifold pipe 16 and the second manifold pipe 17 are provided. Therefore, in order to provide the air vent valve 20 and the hose 19, it is not necessary to increase the size of the indoor unit 103. Thus, the indoor unit 103 can be made smaller than existing indoor units.

In Embodiment 1, in the indoor unit 103 of the air-conditioning apparatus 100, the branch pipe 18c that holds the hose 19 is connected to one of the first manifold pipe 16 and the second manifold pipe 17 that is located further from the indoor heat exchanger 7 from the other.

In the above configuration, the branch pipe 18c that holds the hose 19 is connected to one of the first manifold pipe 16 and the second manifold pipe 17 that is located further from the indoor heat exchanger 7 than the other. Thus, while being bent smoothly, the branch pipe 18c that holds the hose 19 can be elongated to connect to the indoor heat exchanger 7, and the inner space of the indoor unit 103 can be effectively used.

In Embodiment 1, in the hose 19 provided in the indoor unit 103 of the air-conditioning apparatus 100, the end face of the distal end of the lower end portion 19d is inclined relative to the horizontal direction.

In the above configuration, an edge of the inclined end face of the distal end of the lower end portion 19d of the hose 19 is sharp, and water is satisfactorily drained dry without collecting, and water can be effectively let out from the hose 19.

In Embodiment 1, in the indoor unit 103 of the air-conditioning apparatus 100, the gap S is provided between the distal end of the lower end portion 19d of the hose 19 and the bottom 13a of the drain pan 13.

In the above configuration, the gap S is provided between the distal end of the lower end portion 19d of the hose 19 and the bottom 13a of the drain pan 13. Thus, in the case where the air vent valve 20 is opened and water is let out from the hose 19, when dropping onto the bottom 13a of the drain pan 13 through the gap S, the water makes noise of striking the bottom 13a of the drain pan 13. Because of such a noise, an operator can confirm that the air vent valve 20 is in the opened state. It is therefore possible to prevent the operator from forgetting to close the air vent valve 20 and to prevent water from being uselessly let out.

Because provision of the gap S between the distal end of the lower end portion 19d of the hose 19 and the bottom 13a of the drain pan 13, the lower end portion 19d of the hose 19 does not come into contact with the bottom 13a of the drain pan 13, and the hose 19 can thus be prevented from being bent and also being blocked up. Therefore, it is possible to prevent the lower end portion 19d of the hose 19 from being blocked up and to smoothly let out water from the hose 19.

In Embodiment 1, the air-conditioning apparatus 100 includes the indoor unit 103 for the air-conditioning apparatus 100.

In the above configuration, it is possible to prevent the distal end of the lower end portion 19d of the air vent hose 19 from moving uncontrollably without changing the simple structure of the hose 19 and adding an extra component.

<Others>

With respect to the above embodiment, the wall-mounted indoor unit 103 is described above. However, the indoor unit 103 is not limited to such a type of indoor unit. The indoor unit 103 of the air-conditioning apparatus 100 according to the embodiment of the present disclosure can also be applied as a floor-standing type indoor unit, a ceiling concealed type indoor unit, etc.

REFERENCE SIGNS LIST 1 compressor, 2 four-way valve, 3 outdoor heat exchanger, 4 expansion valve, 5 heat-transfer heat exchanger, 6 pump, 7 indoor heat exchanger, 8 panel, 9 grille, 10 box, 11 vane, 12 housing, 13 drain pan, 13a bottom, 14 electrical component box, 15 pipe unit, 16 first manifold pipe, 17 second manifold pipe, 18 branch pipe, 18a branch pipe, 18b branch pipe, 18c branch pipe, 18d branch pipe, 19 hose, 19a inner exhaust pipe, 19b outer protection pipe, 19c gap, 19d lower end portion, 20 air vent valve, 20a main body, 20b knob, 20c exhaust outlet, 20d valve body, 21 heat insulating pipe, 22 air vent pipe, 23 binding band, 100 air-conditioning apparatus, 101 outdoor unit, 102 relay unit, 103 indoor unit, 104 refrigerant circuit, 105 water circuit

The invention claimed is:

1. An indoor unit of an air-conditioning apparatus, comprising:
a heat-medium heat exchanger provided in a housing and configured to cause heat exchange to be performed between a heat medium and indoor air;
an air vent valve configured to allow air to escape from a heat medium passage that allows the heat medium to flow in the heat-medium heat exchanger;
a drain pan provided below the heat-medium heat exchanger and configured to receive condensation water generated at a surface of the heat-medium heat exchanger;
a hose having flexibility, attached to the air vent valve, and configured to let out the air along with the heat medium from the heat medium passage to an inner space in the drain pan; and
a plurality of branch pipes configured to allow the heat medium to flow into the heat-medium heat exchanger or allow the heat medium to flow out of the heat-medium heat exchanger,
wherein the hose has a double-wall structure in which an inner exhaust pipe and an outer protection pipe are provided, and an upper end portion of the hose is fixed to the air vent valve,
wherein the inner exhaust pipe and the outer protection pipe are formed of the same flexible material,
wherein the inner exhaust pipe and the outer protection pipe are provided such that a cylindrical gap is provided between an outer circumferential portion of the inner exhaust pipe and an inner circumferential portion of the outer protection pipe, and
wherein at least one of the plurality of branch pipes is bent around the hose and holds the hose.

2. The indoor unit of the air-conditioning apparatus of claim 1,
wherein the at least one branch pipe that holds the hose is located in a lower portion of the housing.

3. The indoor unit of the air-conditioning apparatus of claim 1,
wherein of the plurality of branch pipes, a branch pipe located in an upper portion of the housing is in contact with the hose on a back side of the hose, and
wherein the at least one branch pipe that holds the hose holds the hose such that a distal end of a lower end portion of the hose is located in the inner space in the drain pan.

4. The indoor unit of the air-conditioning apparatus of claim 1,
wherein the at least one branch pipe that holds the hose is a single branch pipe.

5. The indoor unit of the air-conditioning apparatus of claim 1, further comprising:
a first manifold pipe connected to one of the plurality of branch pipes and configured to allow a heat medium that is to be supplied to the heat-medium heat exchanger to flow though the first manifold pipe or allow a heat medium that flows out of heat-medium heat exchanger to flow through the first manifold pipe; and
a second manifold pipe connected to another one of the plurality of branch pipes and configured to allow the heat medium that flows out of the heat-medium heat exchanger to flow through the second manifold pipe or allow the heat medium that is to be supplied to the heat-medium heat exchanger to flow through the second manifold pipe,
wherein the first manifold pipe and the second manifold pipe are arranged beside the heat-medium heat exchanger in such a manner as to extend in an up-and-down direction, and are provided side by side as viewed in front view, and
wherein the air vent valve and the hose are located between the first manifold pipe and the second manifold pipe as viewed in front view.

6. The indoor unit of the air-conditioning apparatus of claim 5,
wherein the at least one branch pipe that holds the hose is connected to one of the first manifold pipe and the second manifold pipe that is located further from the heat-medium heat exchanger than the other of the first manifold pipe and the second manifold pipe.

7. The indoor unit of the air-conditioning apparatus of claim 1,
wherein in the hose, a distal end of a lower end portion has an end face that is inclined relative to a horizontal direction.

8. The indoor unit of the air-conditioning apparatus of claim 1,
wherein a gap is provided between a distal end of a lower end portion of the hose and a bottom of the drain pan.

9. An air-conditioning apparatus comprising:
the indoor unit of the air-conditioning apparatus of claim 1.

10. An indoor unit of an air-conditioning apparatus comprising:
a heat-medium heat exchanger provided in a housing and configured to cause heat exchange to be performed between a heat medium and indoor air;
an air vent valve configured to allow air to escape from a heat medium passage that allows the heat medium to flow in the heat-medium heat exchanger;

a drain pan provided below the heat-medium heat exchanger and configured to receive condensation water generated at a surface of the heat-medium heat exchanger;

a hose having flexibility, attached to the air vent valve, and configured to let out the air along the heat medium from the heat medium passage to an inner space in the drain pan; and a plurality of branch pipes configured to allow the heat medium to flow into the heat-medium heat exchanger or allow the heat medium to flow out of the heat-medium heat exchanger, wherein at least one of the plurality of branch pipes is bent around the hose and holds the hose.

11. The indoor unit of the air-conditioning apparatus of claim 10, wherein the hose has a double-wall structure and an upper end portion of the hose is fixed to the air vent valve.

12. The indoor unit of the air-conditioning apparatus of claim 10, wherein the at least one branch pipe that holds the hose is located in a lower portion of the housing.

13. The indoor unit of the air-conditioning apparatus of claim 10, wherein of the plurality of branch pipes, a branch pipe located in an upper portion of the housing is in contact with the hose on a back side of the hose, and wherein the at least one branch pipe that holds the hose holds the hose such that a distal end of a lower end portion of the hose is located in the inner space in the drain pan.

14. The indoor unit of the air-conditioning apparatus of claim 10, wherein the at least one branch pipe that holds the hose is a single branch pipe.

15. The indoor unit of the air-conditioning apparatus of claim 10, further comprising:

a first manifold pipe connected to one of the plurality of branch pipes and configured to allow a heat medium that is to be supplied to the heat-medium heat exchanger to flow though the first manifold pipe or allow a heat medium that flows out of heat-medium heat exchanger to flow through the first manifold pipe; and a second manifold pipe connected to another one of the plurality of branch pipes and configured to allow the heat medium that flows out of the heat-medium heat exchanger to flow through the second manifold pipe or allow the heat medium that is to be supplied to the heat-medium heat exchanger to flow through the second manifold pipe, wherein the first manifold pipe and the second manifold pipe are arranged beside the heat-medium heat exchanger in such a manner as to extend in an up-and-down direction, and are provided side by side as viewed in front view, and wherein the air vent valve and the hose are located between the first manifold pipe and the second manifold pipe as viewed in front view.

16. The indoor unit of the air-conditioning apparatus of claim 15, wherein the at least one branch pipe holding the hose is connected to one of the first manifold pipe and the second manifold pipe that is located further from the heat-medium heat exchanger than the other of the first manifold pipe and the second manifold pipe.

17. The indoor unit of the air-conditioning apparatus of claim 10, wherein in the hose, a distal end of a lower end portion has an end face that is inclined relative to a horizontal direction.

18. The indoor unit of the air-conditioning apparatus of claim 10, wherein a gap is provided between a distal end of a lower end portion of the hose and a bottom of the drain pan.

19. An air-conditioning apparatus comprising:

the indoor unit of the air-conditioning apparatus of claim 10.

* * * * *